Figure 1:
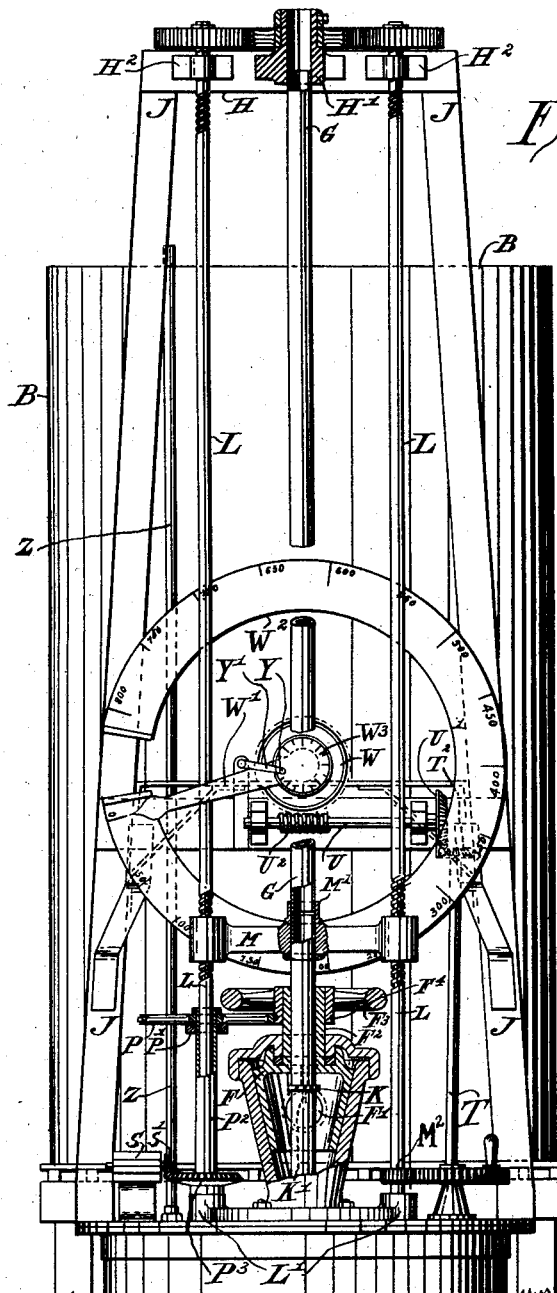

A. A. QUICK & C. J. SPENCER.
APPARATUS FOR CONTROLLING AND REGISTERING THE SUPPLY OF LIQUIDS INTO VESSELS FOR CONTAINING THE SAME.
APPLICATION FILED JAN. 11, 1909.

1,010,953.

Patented Dec. 5, 1911.

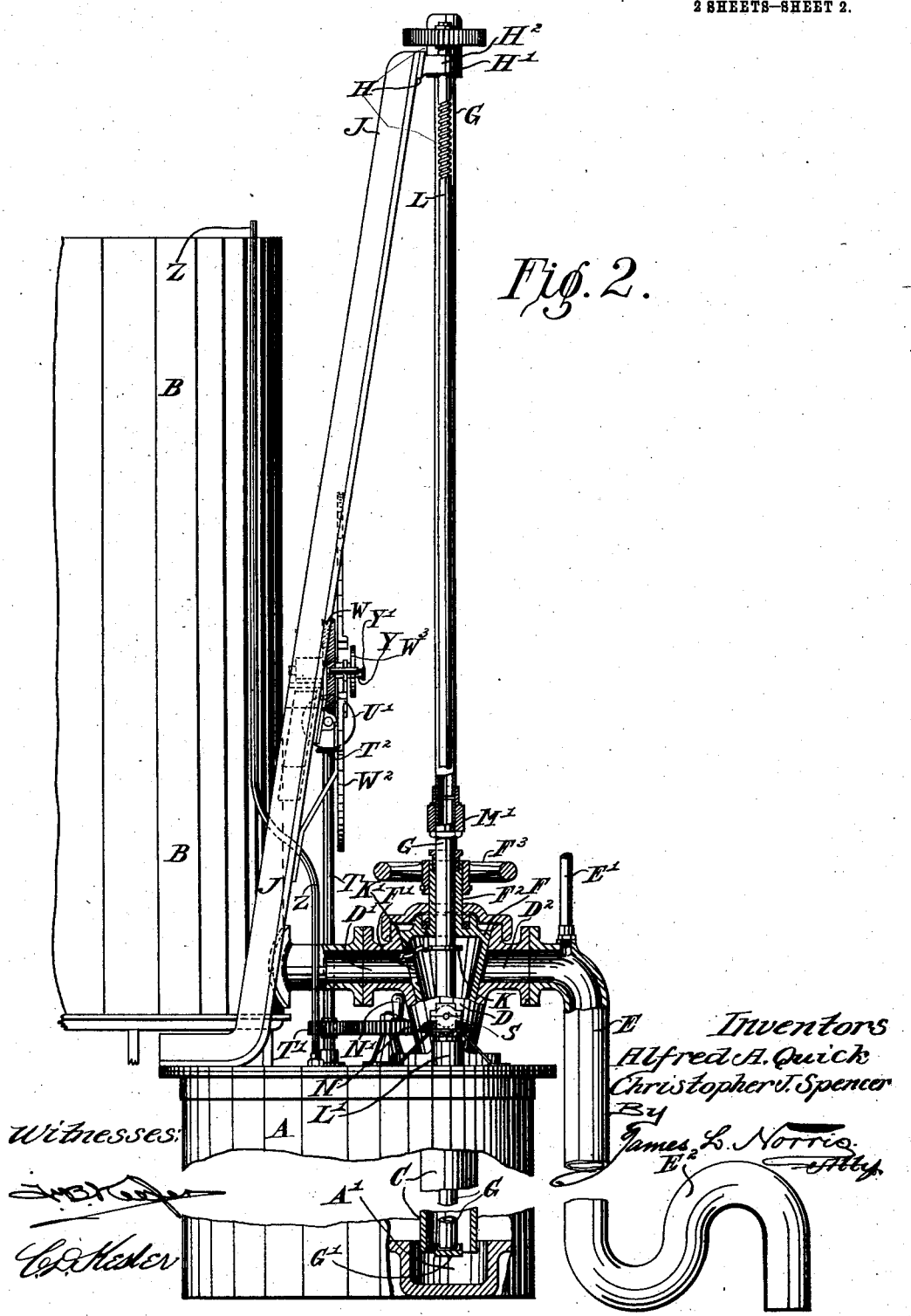

UNITED STATES PATENT OFFICE.

ALFRED ARTHUR QUICK, OF CLIFTON HILL, AND CHRISTOPHER JAMES SPENCER, OF MELBOURNE, VICTORIA, AUSTRALIA.

APPARATUS FOR CONTROLLING AND REGISTERING THE SUPPLY OF LIQUIDS INTO VESSELS FOR CONTAINING THE SAME.

1,010,953.     Specification of Letters Patent.     Patented Dec. 5, 1911.

Application filed January 11, 1909. Serial No. 471,679.

*To all whom it may concern:*

Be it known that we, ALFRED ARTHUR QUICK and CHRISTOPHER JAMES SPENCER, subjects of the King of Great Britain, residing, respectively, at 46 Hilton street, Clifton Hill, driver, and 285 Swanston street, Melbourne, electrician, both in the State of Victoria, Commonwealth of Australia, have invented certain new and useful Improvements in Apparatus for Controlling and Registering the Supply of Liquids into Vessels for Containing the Same, of which the following is a specification.

Our invention relates to an improved apparatus for controlling the supply of liquids into tanks or vessels and refers more particularly to an apparatus for the control of the quantity of kerosene delivered from any source into a tank or vessel for containing the same and especially a transport tank.

The object of this invention is to provide an apparatus by which a control is maintained of the exact quantity of liquid delivered into the tank or vessel so that the management may be able to exercise proper supervision over the amount of liquid being sent out for distribution, such apparatus being also more expeditious and accurate than those hitherto in use. We accomplish this object by providing an apparatus which is arranged between the bulk supply tank and the transport tank or other vessel into which the liquid is to be delivered in such manner that the flow of liquid is necessarily through the said apparatus which provides means whereby an exact amount only may be delivered. This is effected by means of a siphon device which is automatically interrupted by the admission of air at a predetermined point when a quantity of liquid has been abstracted for which the apparatus was previously set.

In order that our invention may be the better understood we will now proceed to describe the same with reference to the accompanying drawings in which:—

Figure 1 is a front elevation partly in section of an apparatus embodying our invention as applied to the delivery of kerosene from a bulk tank into a transport tank. Fig. 2 is a side elevation of the same also partly in section.

A is the measuring tank which is formed of a carefully estimated horizontal sectional area so that when filled to a certain height any exact predetermined quantity of liquid may be contained therein. This tank A is connected to the supply tank B as hereinafter described in such a way that the liquid in passing to the transport tank is caused to flow therethrough. For this purpose the tank A is provided with a downwardly projecting pipe C leading to the bottom thereof and having its lower end accommodated in a recess A'. This pipe C projects out through the top of the tank A and is connected to a casing D forming a T-piece to the said pipe C one branch D' of which leads to the supply tank B while the other branch $D^2$ leads to the discharge siphon pipe E. This casing D is provided with an internal hollow plug F having a vent F' and formed with an upwardly projecting sleeve $F^2$ upon which is mounted a wheel $F^3$ by which the same may be rotated. Thus by manipulating the wheel $F^3$ the flow may be either directed from the supply tank B through the branch pipe D' into the pipe C leading to the measuring tank A or from the measuring tank A through the pipe C to the branch $D^2$ and thence through the delivery siphon pipe E to the transport tank (not shown). Within the pipe C is arranged a smaller pipe G projecting upward through the sleeve $F^2$ and extending to a point above the top of the supply tank B and supported at such point in a bearing H' in a cross piece H carried upon standards J. This pipe G is provided at its lower end with a cap G' having perforated sides through which the liquid may enter into the bottom of the said pipe G. When the pipe G is raised to its highest position the cap G' engages a hinged fork K having a finger K' which projects into the vent F' in the plug F. Surmounting the measuring tank A are two screw threaded rods L having their lower ends fitted in step bearings L' upon the top of the tank A, and their upper ends journaled in bearings $H^2$ upon the cross piece H. Upon these rods L is a movable cross piece M having a central socket M' which engages the pipe G so that the same may be raised or lowered as required to any desired height. The screw-threaded rods L are operated by one of them having a spur pinion $M^2$ which gears with a spur wheel N having a handle N' for its rotation. Thus by turning the spur wheel N the cross piece M may be raised or lowered to any desired position, carrying with it the pipe G. The siphon delivery pipe E is provided at its upper end with a small pipe E' designed to be connected to a vacuum pump or chamber for the purpose of starting the siphon operation, the lower end of said pipe being formed with an S-piece or trap E² to prevent the admission of air during the formation of the vacuum in the pipe E. The same purpose may be achieved by closing the bottom of said pipe E in any other manner. In addition a pipe Z is provided extending from the top of the tank A to a point above the tank B for the outflow of air as liquid is fed in, allowing at the same time of the liquid rising therein.

In operation for the delivery of the liquid, the pipe G is raised to its highest point within the pipe C by manipulating the wheel N so as to move the cross piece M upwardly upon the screw threaded rods L, the cap G' then engaging the fork K and thereby carrying the projecting finger K' out of engagement with the vent F' in the plug F. The liquid is then allowed to flow from the supply tank B into the measuring tank A which as before described is adapted to contain a predetermined quantity, say 800 gallons, the flow being through the branch D', the interior of the plug F, the pipe C, and into the tank A. When the tank A is filled the plug F is turned in the opposite direction by means of the wheel F³, this action being permitted by the finger K' of the fork K being at that time out of engagement with the vent F' of the plug F. The vent F' then opens into the branch pipe D² leading into the siphon pipe E, while the branch D' is cut off. By this mechanism it is impossible to turn the plug F for discharge unless the pipe G has been raised to its highest point in order to operate the fork K. The pipe G is then lowered by the before described means to the depth representing the quantity required for delivery. The siphon action is then commenced by operating the vacuum pump connected with the pipe E', the pipe E being connected to the transport tank. That quantity of liquid within the measuring tank A, predetermined by the aforesaid lowering of the pipe G, is thus delivered into the transport tank the level of the liquid in the measuring tank receding during such delivery until it reaches the lower end of the pipe G coincident with the completion of the delivery. At this point air enters the tank A through the perforated cap G', thus interrupting the siphon action and terminating the flow of the liquid.

There is preferably combined, with the dispensing apparatus above described, mechanism for the purpose of recording and registering the amount of liquid that is delivered through the supply tank A. In the construction illustrated, which is considered advantageous for most purposes, the operating wheel F³ is formed with a series of teeth F⁴ on its under side engaging a spur wheel P mounted upon a sleeve P² surrounding one of the rods L and having associated therewith pawl and ratchet mechanism P' so that it operates only in one direction. This sleeve P² carries a bevel wheel P³ at its lower end which gears with a spur pinion S' which operates an aggregate register S. Thus the total amount of liquid that is delivered through the measuring tank A is recorded and displayed in the aggregate register S. Furthermore the operating spur wheel N engages another spur pinion T' mounted upon an upwardly projecting rod T which carries at its upper end a bevel pinion T² engaging a bevel wheel U' mounted upon a horizontal shaft U. This horizontal shaft U carries a worm U² which engages a worm wheel W. Upon the face of this worm wheel W is provided a pointer W' and the position of the pointer W' on the arcuate scale W² indicates exactly the amount of liquid to be delivered corresponding with the position to which the pipe G is lowered. Furthermore to obtain an additional record there is provided upon the face of the worm wheel W a holder W³ arranged to receive a graduated recording disk. For the purpose of marking this graduated disk a stylus or pin Y is provided attached to a hinged arm Y'. Thus in operation a separate graduated disk is utilized for every filling operation, it being placed in position upon the holder W³ and as the operating wheel N is turned this disk is marked with a concentric ring or scratch which corresponds with the graduations thereon and constitutes a permanent record of the quantity delivered from the tank A. This graduated disk is preferably used in conjunction with separate apparatus designed by us for recording and registering the amount of liquid delivered from the transport tanks into the measuring cans, the marks delineated thereon by this present apparatus being upon one side while the marks delineated thereon by the other apparatus being upon the other side, so that the disks may be maintained on file and an accurate register maintained of the amount of liquid which has been sent out for delivery and which has been delivered.

We claim:—

1. In a liquid dispensing apparatus, the combination of a measuring tank; a pipe leading thereinto; a siphon discharge pipe communicating with the first-named pipe; a pipe extending through said first-named pipe for supplying air to the latter, to automatically interrupt the siphon action of the discharge pipe; and means for vertically adjusting the air-supply pipe, to vary the point of such interruption.

2. In a liquid dispensing apparatus, the combination of a supply tank; a measuring tank; a pipe leading into the measuring tank; a T-piece mounted on said tank and having its stem connected with said pipe, and one branch connected with the supply tank; a siphon discharge pipe connected with the other branch; a valve arranged in said T-piece for opening and closing communication between the first-named pipe and either of said branches; means for operating said valve; and means associated with said discharge pipe for automatically interrupting the siphon action of the same at a predetermined point.

3. In a liquid dispensing apparatus, the combination of a supply tank; a measuring tank; a pipe leading into the measuring tank; a T-piece mounted on said tank and having its stem connected with said pipe, and one branch connected with the supply tank; a siphon discharge pipe connected with the other branch; a vented hollow valve arranged in said T-piece for opening and closing communication between the first-named pipe and either of said branches; means for operating said valve; a member carried by said valve and arranged for movement into position to engage either branch to prevent movement of said valve; and means for moving said member out of such position, to permit movement of said valve.

4. In a liquid dispensing apparatus, the combination of a supply tank; a measuring tank; a pipe leading into the measuring tank; a T-piece mounted on said tank and having its stem connected with said pipe, and one branch connected with the supply tank; a siphon discharge pipe connected with the other branch; a vented hollow valve arranged in said T-piece for opening and closing communication between the first-named pipe and either of said branches; means for operating said valve; a member located within said valve and arranged to project through the vent therein into position to engage either branch, to prevent movement of said valve; and means extending through said valve and arranged to engage said member for moving the same out of such position, to permit movement of said valve.

5. In a liquid dispensing apparatus, the combination of a measuring tank; a supply tank; a pipe leading into the measuring tank; a T-piece mounted on said tank and having its stem connected with said pipe, and one branch connected with the supply tank; a siphon discharge pipe connected with the other branch; a valve arranged in said T-piece for opening and closing communication between the first-named pipe and either of said branches; a member carried by said valve and arranged for movement into position to engage either branch, to prevent movement of said valve; a member associated with said valve for supplying air to said first-named pipe, to automatically interrupt the siphon action of said discharge pipe; and means carried by the second-named member for moving the first-named member out of such position, to permit movement of said valve.

In testimony whereof we have hereunto set our hands in presence of two subscribing witnesses.

ALFRED ARTHUR QUICK.
CHRISTOPHER JAMES SPENCER.

Witnesses:
CLEM A. HACK,
STELLA E. HACK.

---

Copies of this patent may be obtained for five cents each, by addressing the "Commissioner of Patents, Washington, D. C."